Feb. 17, 1948.   C. S. WATT   2,436,274
BEARING
Filed Sept. 14, 1946   3 Sheets-Sheet 1

Inventor
Colin S. Watt.
Parker, Trochnow & Farmer,
Attorneys

Inventor
Colin S. Watt.
Attorneys.

Feb. 17, 1948. C. S. WATT 2,436,274
BEARING
Filed Sept. 14, 1946 3 Sheets-Sheet 3

INVENTOR.
Colin S. Watt.

Patented Feb. 17, 1948

2,436,274

UNITED STATES PATENT OFFICE 2,436,274

BEARING

Colin S. Watt, Buffalo, N. Y.

Application September 14, 1946, Serial No. 697,032

16 Claims. (Cl. 308—174)

1

This invention relates to roller bearings of the type which may be employed both as axial and radial bearings.

One of the objects of this invention is to provide a bearing of this type which is particularly suitable for use in connection with rotating parts of large diameters. Another object of this invention is to provide a bearing of this type which may revolve about a circular path or about a path of elliptical or other non-circular shape. It is also an object of this invention to provide a bearing of this type in the form of an endless chain provided with alternate bearing links having rollers arranged thereon which rotate about the bearing links of the chain. Another object is to provide a bearing of this type in which the bearing links of a bearing chain are provided with a plurality of chains of rollers capable of taking axial and radial thrusts.

It is also an object of this invention to provide a bearing of this type in the form of an endless chain in which the bearing links have rounded peripheral portions about which chains of rollers move and which rounded portions have parts thereof rounded concentrically with the races with which the rollers engage, to provide contact at one time for a plurality of rollers with each of the relatively rotatable parts. A further object is to provide a bearing having relatively large bearing links forming part of a chain and in which each bearing link has about its periphery a chain formed of smaller bearing links provided around their peripheries with chains of rollers.

Another object is to provide a bearing of this type in which the bearing links have a curved periphery about which a chain of rollers is formed to revolve, and in which the bearing links are hollow and have additional chains of rollers arranged within said links and operating in a plane perpendicular to the first mentioned chain to provide both axial and radial bearings.

Other objects and advantages of this invention will appear from the following description and claims.

Figure 1:
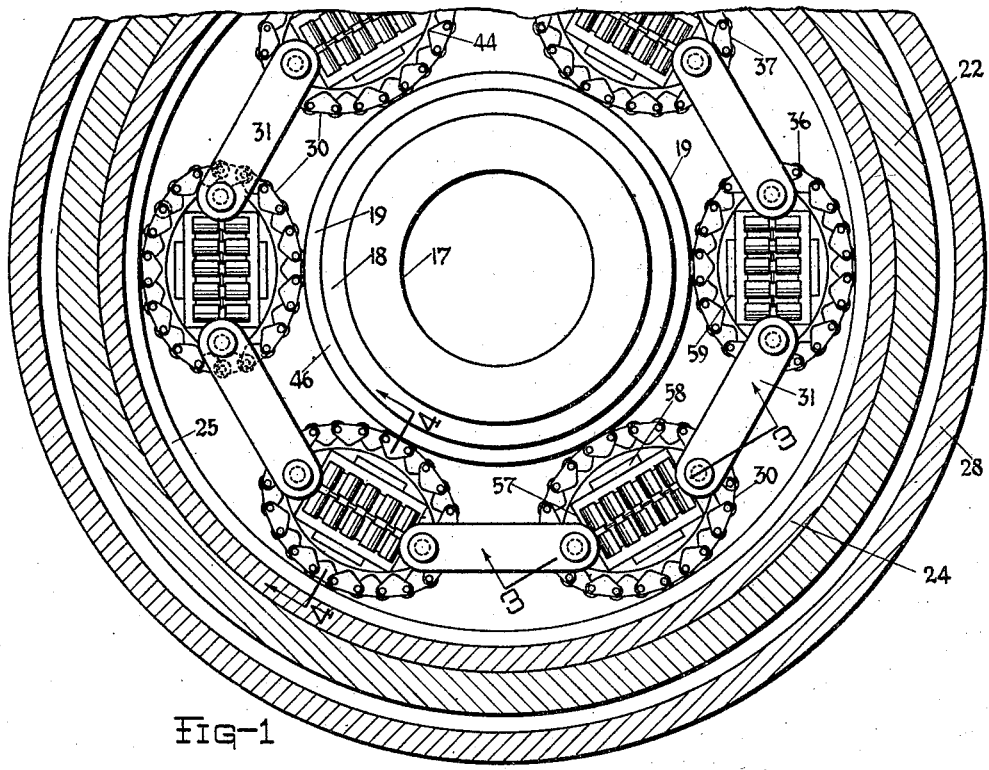
Fig. 1 is a fragmentary sectional plan view of a bearing embodying this invention, the section being taken on line 1—1, Fig. 2.
Figure 3:
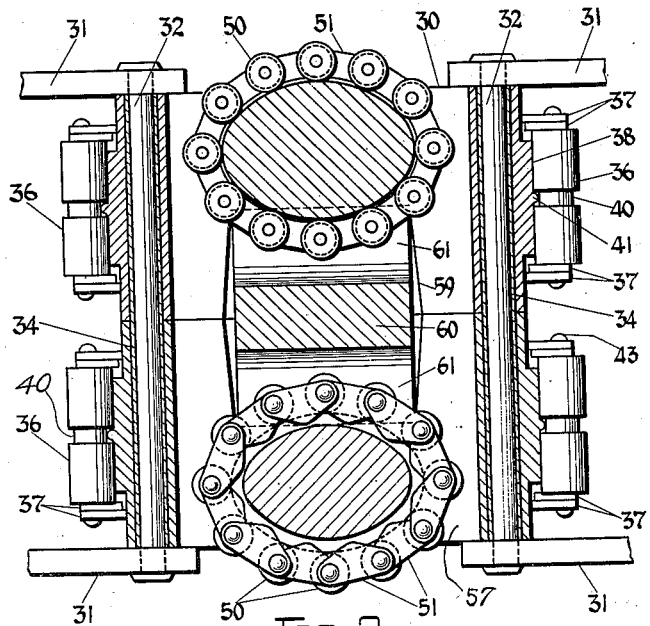
Figure 4:
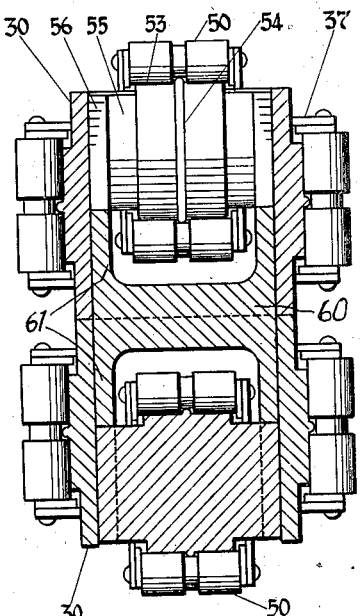

Figs. 3 and 4 are fragmentary sectional elevations thereof, on an enlarged scale, on lines 3—3 and 4—4 respectively, Fig. 1.

2

Figure 5:
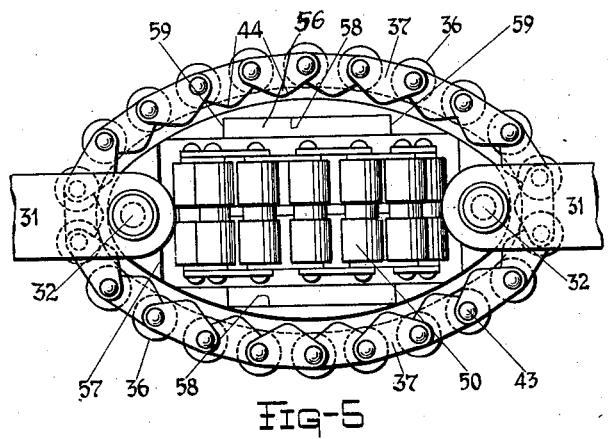

Fig. 5 is a plan view of one of the bearing links of my improved bearing.

Figures 6, 7:
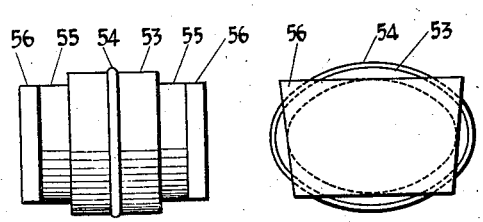

Figs. 6 and 7 are respectively side and end views of a supporting member for one of the inner bearing roller chains which carry the thrust or axial loads.

Figure 8:
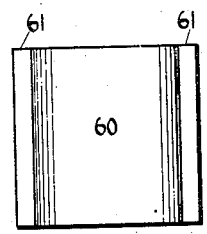
Figure 9:
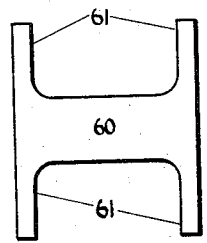

Figs. 8 and 9 are side and end views respectively, of a filler and reinforcing piece used in the hollow bearing links.

Figure 10:
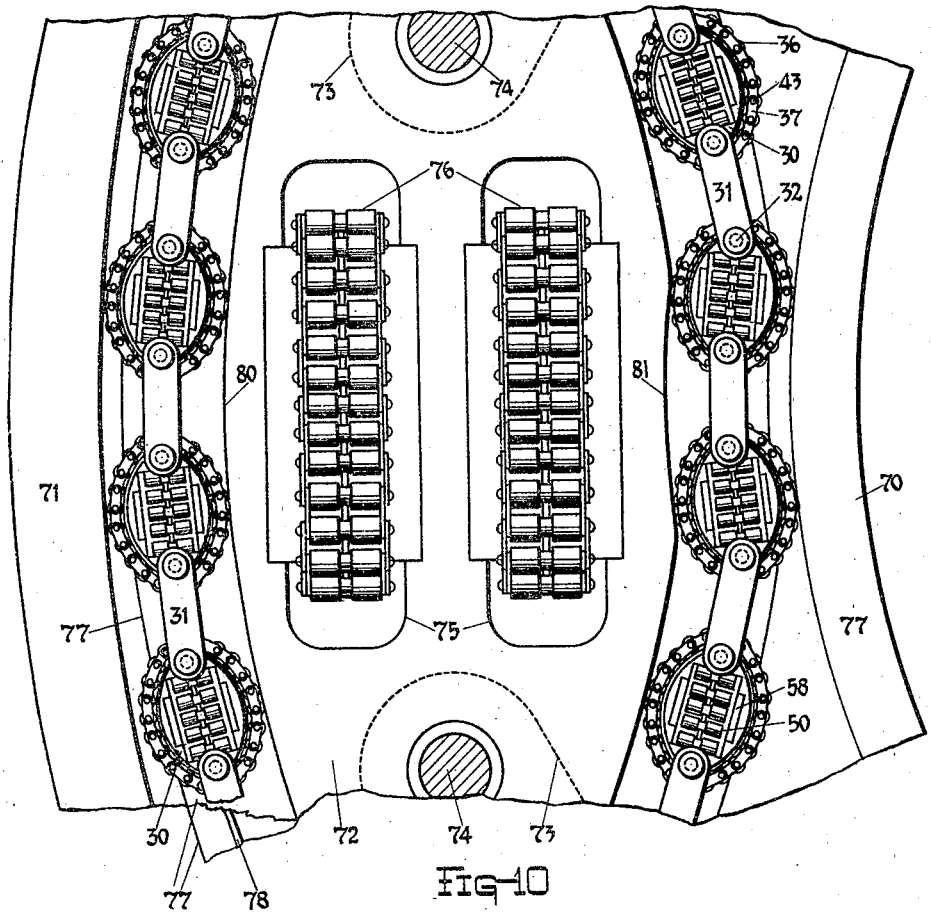

Fig. 10 is a fragmentary plan view of a bearing of modified construction.

My improved bearing may be used in connection with any types of members rotatably relatively to each other, and in the construction illustrated by way of example in Figs. 1 to 9, this bearing is shown as applied to a vertical shaft 15 which is rotatable relatively to a stationary base 16. This base is provided with an upwardly extending central column or cylinder 17 which supports an annular race member 18 having a pair of substantially cylindrical projections 19 thereon to form races or tracks for the rollers of the radial bearing parts, and an upwardly projecting annular race or track 20 for the axial parts of the bearing. The shaft 15, in the construction shown, is provided with a downwardly extending annular flange 22 within which a rotatable race member 24 is mounted which has cylindrical inwardly projecting portions 25 which form races or tracks for the radial parts of my improved bearing and an annular downwardly extending race or track 26 for cooperating with the thrust or axial parts of my bearing. The base 16 may have an upwardly extending flange 28, which together with the central column 17 form an annular trough for confining lubricant within the space occupied by the bearing.

The annular space between the race members 18 and 24 contains my improved bearing which includes an endless chain formed of alternately arranged bearing links 30 and plain or connecting links 31. The bearing links 30 are of substantially elliptical shape and are made hollow and have pins 32 extending through the end portions thereof and through the ends of the plain links 31, as clearly shown in Fig. 3. If desired, the holes through which the pins 32 extend may be provided with bushings 34.

The bearing links 30 are provided with a rounded periphery, which, in the construction shown in Figs. 1 to 5, is substantially elliptical and about which one or more chains of rollers extend. These chains comprise rollers 36 connected at their ends by means of links 37 and the rollers operate on tracks or races 38 extending about the peripheries of the bearing links. In order to facilitate maintaining the chains of rollers in correct relation to the bearing links 30, the rollers preferably have grooves 40 formed in the middle portions thereof and the races 38 are provided with projections 41 which may extend into the grooves 40 of the rollers, and thus hold the rollers in their correct relation to the races or tracks.

The rollers may be of any suitable construction and may be either in the form of substantially cylindrical rolls or rods having projecting pivot parts on the ends thereof to which the links 37 are connected, or if desired, the roller may be of tubular form and may have pins 43 extending through the same and projecting beyond the ends of the rollers for connection with the links 37, so that the ends of the pins form pivots connecting the links. If desired, the links 37 may have projecting parts 44, which extend inwardly toward the upper and lower edges of the tracks or races 38 thereof to further prevent the chains from becoming dislocated with reference to the tracks or races. I have shown two chains of rollers on each bearing link, but one or more than two of such chains may be used.

Figure 2:
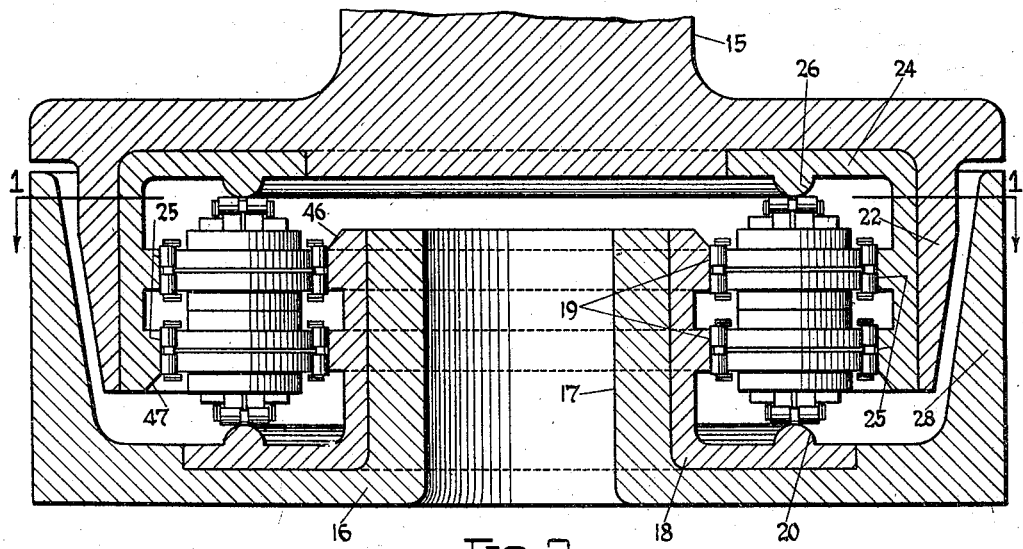
Fig. 2 is a fragmentary sectional central elevation thereof.

From the foregoing description, it will be evident that the chain of bearing and plain links when positioned in the annular space between the races 19 and 25 shown in Figs. 1 and 2, will form a radial bearing between the shaft 15 and the base 16. The upper race 19 preferably terminates in its upper end in a beveled or inclined annular face 46, and the lower outer race 25 may be provided with a similar beveled face 47 to facilitate insertion of the bearing chain between these two races.

The bearing links 30 are also provided with chains or rollers which act as thrust or axial bearings, and these bearing links are, consequently, made hollow so that these axial roller chains may be mounted within the hollow bearing members 30 and have portions thereof projecting beyond the ends of the same to engage with the races or tracks 20 and 26 of the two relatively rotatable members. In the construction illustrated for this purpose, by way of example, I have provided for each bearing link 30 a pair of guide blocks, one block being provided for each of the axial chains of rollers. These chains may be made in the same manner as the axial roller chains, and include rollers 50 connected by links 51, and if desired, the rollers 50 and chain links 51 may be identical with the rollers 36 and links 37 employed in the radial bearing roller chains. Each of these axial bearing roller chains is mounted on a guide block formed to be secured within a hollow bearing link 30 and the guide blocks, see particularly Figs. 6 and 7, are each provided with a track or race 53 having a central ridge or bead 54 which may extend into the annular grooves formed in the rollers 50. These guide blocks also include integral extensions 55 at opposite sides of the tracks or races 54 and these extensions terminate in wedge-shaped flat ends 56.

The bearing links 30 are preferably made in two halves, which in the construction illustrated, form upper and lower halves of the bearing links 30, and these two halves are secured together in any suitable manner, for example, by means of the pivot pins 32 and bushings 34. The two halves of the bearing links 30 have substantially rectangular openings 57 therein, which openings are provided at the opposite longer sides thereof with outwardly extending recesses 58, see Figs. 3 and 5. These recesses are provided at opposite ends thereof with inclined sides 59, Fig. 3, which converge toward the outer faces of the bearing link 30. These recesses receive the wedge-shaped ends 56 of the guide blocks of the axial roller chains, in such manner that these guide blocks fit into the outer portions of the openings or holes in the bearing links 30.

The guide blocks for the axial roller chains are spaced apart by means of a suitable spacing member which also reinforces the hollow bearing link 30. This reinforcing member, in the construction shown, is substantially in the form of an eye beam having a relatively thick web 60 and flanges 61, see particularly Figs. 8 and 9. The ends of the flanges as clearly shown in Fig. 4, engage the inner edges of the wedge-shaped portions 56 of the guide blocks for the axial roller chains, and thus hold these guide blocks in their outer positions in the hollow bearing links 30. The relatively thick web 60 of the reinforcing members extends crosswise of the portions of the hollow bearing links 30 which receive the pressures or radial thrusts of the bearing, and thus prevent the hollow bearing links 30 from being crushed or collapsed by the radial pressures exerted by the shaft 15 against the fixed bearing member 16.

The construction described facilitates the assembly of the hollow bearing links 30 in that the guide blocks with the axial roller bearing chains mounted thereon are first inserted into the two halves of the links 30 and the reinforcing member is then inserted between the guide blocks, whereupon the two halves of the links 30 may be secured together in any suitable manner, for example, by means of the bushings 34 and bearing pins 32. Since the axial bearing rollers rotate about paths perpendicular to the axis of rotation, the outer ends of the rollers 50 would tend to travel in a circle of greater radius than the inner ends of these rollers, and consequently, this differential movement is compensated for by providing races 20 and 26 which are of rounded form and which engage only the edge portions of the rollers 50 adjacent to the central annular groove therein.

Since the stationary bearing member 16 is substantially in the form of an annular trough which may be filled with oil or other lubricant, my improved bearing chain may operate in lubricant at all times.

In the operation of my improved bearing chain, it will be noted that since the axial bearing chains, including the rollers 50, travel about their tracks or races 53 independently of each other and independently of the radial bearing chains, it is immaterial whether the races 20 and 26 are of the same or different diameters. Assuming that perfect contact is maintained between the rollers of the radial roller chains and the tracks or races 19 and 25, when the shaft 15 is revolving, this shaft will make two revolutions while the bearing chain comprising the links 30 and 31 makes one revolution. Consequently, the centrifugal force of the bearing chain which carries the bearing rollers 30 is correspondingly reduced and this permits greater speed of the shaft 15 without endangering the strength of the bearing chain, which contacts with the revolving shaft.

In Fig. 10, I have illustrated a bearing embodying my invention which is intended for rotary members requiring bearings of exceptionally large diameters, in which 70 represents the race part of one of the two relatively revolvable members, which may be either the stationary or the movable member, and 71 represents the other relatively revolvable member. In this case, the bearing is formed by a chain comprising relatively large bearing links 72 connected with plain or ordinary links 73 by means of hinge pins 74.

Instead of providing a chain of rolls around the large bearing link 72 as in the construction shown in the preceding figures, I provide around each of the large bearing links 72 of the large bearing chain a small bearing chain constructed in the same manner as described in connection with the preceding figures, the small bearing chain comprising bearing links 30 and connecting links 31 which may be identical with the construction already described and smaller bearing chains of this type, comprising bearing links 30 and straight links 31, extend around each of the large bearing links 72 of the large bearing chain.

The large bearing links may be quite similar in construction to the smaller bearing links 30 which have already been described. Preferably, however, I provide in each of the large bearing links 72, two holes or openings 75 for the reception of the thrust or axial bearing chains 76. These axial bearing roller chains may be substantially similar in construction to those described in connection with Figs. 1 to 9, and may be similarly mounted on the bearing links 72. The larger bearing links 72 are preferably also constructed in two parts which are secured together by means of the pivot pins 74. The two large relatively rotatable members are provided with suitable races (not shown) for the axial roller chains 76.

In order to secure the smaller chain including the bearing links 30 and plain links 31 in place on the larger bearing links 72, these larger links are provided with one or more outwardly extending webs or plates 77 with which the upper and lower axial roller chains of the bearing links 30 engage to hold the smaller bearing chain in correct relation to its larger bearing link 72. These ledges or plates may be of any suitable construction and may have rounded bead-like races 78 formed thereon similar to the races 20 and 26 shown in Fig. 2.

It will be obvious that one advantage of this construction is that the larger bearing links 72, if perfect contact is maintained between the rollers and their races, will move only once around its path while the rotary member 70 or 71 rotates three times, thus greatly reducing centrifugal force acting on this large bearing chain, and thus permitting high speed to be maintained between the relatively rotatable parts 70 and 71.

The large bearing link 72 may have a major portion of the outer periphery 80 thereof formed so as to be concentric with the race on the outer member 71 so that two or more of the smaller bearing links 30 may be in contact simultaneously with the outer bearing race. Similarly the inner peripheral part of the larger bearing link 72 may be provided with a portion 81 which is concentric with the race on the member 70 so that two or more of the small bearing links 30 may simultaneously engage the large bearing link and the inner race, thus enabling the bearing to withstand greater pressures than when only a single bearing link 30 receives radial pressure at one time. This contour, as shown on the larger bearing link 72, may also be provided on the smaller bearing links 30 by making portions of the periphery of approximately the same curvature as the races of the relatively rotatable members, or if desired, the smaller bearing links 30 may be made more elongated so that a larger number of the rollers of the radial roller chains may engage the races of the relatively rotatable parts at one time.

The bearing described has the advantage that the usual cages used to hold the balls or rolls of bearings as heretofore constructed are eliminated. Another advantage of my improved bearing is that it may be used either in a circular path or in an elliptical or other non-circular path. The bearing operates with the minimum of friction and can be economically constructed, since the various parts comprising the same are inexpensive to produce.

The bearings illustrated in the drawings and herein described are merely illustrative of two embodiments of this invention, and it is not intended that the invention shall be limited to the particular embodiments shown.

I claim as my invention:

1. A radial bearing between two relatively rotatable members, including an endless chain formed of alternately arranged bearing links and connecting links, said chain being arranged between said relatively rotatable members, each of said bearing links having a series of rollers connected by links and arranged to roll about the periphery of a bearing link, one of said rotatable members having a race formed to contact the rollers at the inner peripheral portions of said bearing links and the other rotatable member having a race formed to contact rollers on the outer peripheral portions of said bearing links, to form a radial bearing between said two parts.

2. A radial and axial bearing for two members, one of which is rotatable relatively to the other, including an endless chain of alternately arranged hollow bearing links and connecting links pivotally connected to said bearing links and arranged between said rotatable members, each of said hollow bearing links having a rounded periphery and two sides extending substantially perpendicular to said rounded periphery, a roller chain comprising rollers connected by links extending about and bearing on said rounded periphery and forming a radial bearing between said members, and chains of rollers mounted within said hollow bearing links to move independently of each other in a plane substantially perpendicular to said first mentioned chain of rollers and extending beyond said two sides of said bearing links to form an axial bearing for said rotatable members.

3. A radial and axial bearing for two members, one of which is rotatable relatively to the other and which have bearing races thereon, said bearing including an endless chain comprising alternately arranged hollow bearing links and connecting links, said connecting links being pivotally connected with said hollow bearing links, said endless chain being arranged between said races, each of said hollow bearing links being provided with a rounded periphery extending about the same and with opposite faces extending substantially at right angles to said periphery, an endless chain for each bearing link comprising rollers connected by links and mounted to roll on the periphery of the bearing link and on said races to form a radial bearing between said members and a pair of endless chains of rollers connected by links and mounted within said bearing links and extending beyond said opposite faces and engaging parts of said relatively rotatable members to form an axial bearing therefor.

4. A bearing according to claim 2 in which cooperative means are provided on said periphery and on said roller chain extending about said periphery to hold said roller chain in operative relation to its bearing link.

5. A bearing according to claim 2 in which said rollers of said roller chain extending about said periphery of a bearing link are provided with annular grooves intermediate of the ends thereof and in which said periphery is provided with a ridge extending into said annular grooves of said rollers to hold said roller chain in operative relation to said bearing links.

6. A radial and axial bearing for two members, one of which is rotatable relatively to the other, said bearing including an endless chain comprising alternately arranged hollow bearing links and connecting links, said connecting links being pivotally connected with said bearing links, each of said bearing links having an endless roller chain comprising rollers connected by links, extending about the periphery thereof and engaging said relatively rotary members to form radial bearings therefor, a pair of guide blocks arranged within each of said hollow bearing links, and a roller chain extending about each guide block and forming an axial bearing for said members.

7. A bearing according to claim 6 in which said hollow bearing links are formed in two halves divided from each other along a plane extending substantially parallel to said first mentioned bearing chain, and in which said two halves are secured together by pivot pins connecting said bearing links and said connecting links.

8. A bearing according to claim 6 in which said guide blocks are spaced apart by a spacing member which reinforces the hollow bearing links against axial forces exerted thereon by said relatively rotatable members.

9. A radial bearing between two relatively rotatable members, including an endless chain formed of alternately arranged bearing links and connecting links, said chain being arranged between said relatively rotatable members, each of said bearing links having a plurality of endless chains, comprising rollers connected by links, arranged to roll about the periphery of said bearing link, each of said rotatable members having races formed to contact with said roller chains, and means for holding said roller chains in operative relation to said bearing links and said races.

10. A radial and axial bearing for two members, one of which is rotatable relatively to the other, said bearing including an endless chain comprising alternately arranged hollow bearing links and connecting links, said connecting links being pivotally connected with said hollow bearing links, said hollow bearing links being formed in two halves which meet in a plane extending substantially parallel to said endless chain, an endless roller chain for each half hollow bearing link, comprising rollers pivotally connected by links and extending about peripheries of said two halves, each half bearing link being provided with a guide block secured therein, an endless roller chain, comprising rollers connected by links, extending about each guide block in a plane substantially perpendicular to the plane of said first mentioned roller chains, a spacing member arranged within said hollow bearing link and engaging said bearing blocks to hold the same in operative relation to said bearing link and engaging the interior surface of said hollow bearing link to prevent crushing of said link when exposed to radial forces, and means for securing said halves together.

11. A bearing according to claim 10 characterized in that said hollow bearing links are provided with means for limiting the extent to which said guide blocks and the roller chains mounted thereon may extend beyond opposite faces of said links.

12. A bearing according to claim 10 characterized in that said two halves of a bearing link have outwardly converging internal surfaces and that said guide blocks have correspondingly converging surfaces adapted to engage with the converging surfaces of said hollow bearing links to limit the extent to which said bearing blocks and the chains of rollers mounted thereon may extend beyond opposite faces of said bearing links, said guide blocks and said spacer bracing said hollow links to prevent crushing of the same by radial forces.

13. A radial bearing for use between two members, one of which is rotatable relatively to the other, said bearing comprising alternatively arranged bearing links and connecting links pivotally connected at their ends to said bearing links, each of said bearing links having an endless bearing chain extending about the same and formed of smaller bearing links and connecting links and having the connecting links pivotally connected with said bearing links, each of said smaller bearing links having an endless roller chain formed of rollers connected by links extending about the peripheral portions thereof to form a bearing between said first mentioned bearing link and said relatively rotatable members.

14. A radial bearing according to claim 13 characterized in that said first mentioned bearing links are of substantially elliptical form and have portions of the opposite sides thereof curved to correspond with the curvature of said two relatively rotatable members.

15. A bearing according to claim 13 characterized in that said first mentioned bearing links have outwardly extending peripheral webs on which said chain including said smaller bearing links is supported in operative relation to said first mentioned links.

16. A radial and axial bearing for two members, one of which is rotatable relatively to the other, said bearing including alternately arranged bearing links and connecting links pivotally connected at their ends to said bearing links, each of said bearing links having an endless bearing chain extending about the same and formed of smaller bearing links and connecting links and having the connecting links pivotally connected with said bearing links, each of said smaller bearing links having an endless roller chain formed of rollers connected by links extending about the peripheral portions thereof to form a bearing between said first mentioned bearing link and said relatively rotatable members, said first mentioned bearing links each having an opening extending through the same in a direction transverse to said bearing chains, and a pair of chains of rollers mounted in said openings and extending beyond opposite faces of said first mentioned bearing links to form radial bearings between said relatively rotatable members.

COLIN S. WATT.